United States Patent [19]

Kainthia et al.

[11] Patent Number: 5,156,934

[45] Date of Patent: Oct. 20, 1992

[54] METHOD OF MAKING A RECHARGABLE MODIFIED MANGANESE DIOXIDE MATERIAL AND RELATED COMPOUND AND ELECTRODE MATERIAL

[75] Inventors: Ramesh C. Kainthia; David J. Manko, both of College Station, Tex.

[73] Assignee: RBC Universal Ltd., Bryan, Tex.

[21] Appl. No.: 653,791

[22] Filed: Feb. 11, 1991

[51] Int. Cl.$^5$ .............................................. H01M 4/04
[52] U.S. Cl. ..................... 429/224; 423/605; 252/182.1
[58] Field of Search ...................... 429/224; 252/182.1; 423/605

[56] References Cited

U.S. PATENT DOCUMENTS

| | | | |
|---|---|---|---|
| 1,293,463 | 2/1919 | Kaplan | 429/194 |
| 3,533,740 | 12/1967 | Grund et al. | 23/145 |
| 3,535,217 | 12/1967 | Amano et al. | 204/96 |
| 3,773,916 | 1/1972 | Preisler et al. | 423/605 |
| 3,948,684 | 4/1976 | Armstrong | 136/120 |
| 4,006,217 | 2/1977 | Faber et al. | 423/605 |
| 4,042,586 | 2/1978 | De Nora et al. | 204/105 |
| 4,048,027 | 9/1977 | Senderoff | 204/61 |
| 4,133,856 | 1/1979 | Ikeda et al. | 423/605 |
| 4,170,527 | 10/1979 | Beer et al. | 204/96 |
| 4,269,691 | 5/1981 | Deborski | 204/290 |
| 4,277,360 | 7/1981 | Mellors et al. | 252/182.1 |
| 4,295,943 | 10/1981 | Tomov et al. | 204/96 |
| 4,362,791 | 12/1982 | Kaneko et al. | 429/101 |
| 4,405,699 | 9/1983 | Kruger | 429/224 |
| 4,451,543 | 5/1984 | Dzieciuch | 429/206 |
| 4,476,104 | 10/1984 | Mellors | 423/605 |
| 4,520,005 | 5/1985 | Yao | 423/599 |
| 4,728,586 | 3/1988 | Venkatesan et al. | 429/94 |
| 4,863,817 | 9/1989 | Ogino et al. | 429/194 |

FOREIGN PATENT DOCUMENTS 138316 7/1984 European Pat. Off. .

OTHER PUBLICATIONS

Kordesch et al., "Electrochemcia Acta." 26 (1495) (1981).
Wroblowa, et al., "Journal of Electroanalytic Chemistry," 238, 93 (1987).

*Primary Examiner*—Brian E. Hearn
*Assistant Examiner*—M. Nuzzolillo
*Attorney, Agent, or Firm*—Arnold B. Silverman; Michael J. Kline

[57] ABSTRACT

A method of making a rechargeable modified manganese dioxide material for use as battery electrode is disclosed. The method includes mixing manganese dioxide with an aqueous solution of a water soluble salt component selected from the group consisting of bismuth nitrate, lead acetate, lead nitrate, copper sulfate, copper nitrate, copper chloride and mixtures thereof. An alkaline hydroxide solution is then added to establish precipitation of resultant product. The resultant product is washed, filtered and dried to obtain the modified manganese dioxide material. The material is combined with a suitable conducting reinforcement component and a binder to form a high density, low resistivity electrode material.

38 Claims, 7 Drawing Sheets

METHOD OF MAKING A RECHARGABLE MODIFIED MANGANESE DIOXIDE MATERIAL AND RELATED COMPOUND AND ELECTRODE MATERIAL

BACKGROUND OF THE INVENTION

1. Field of the Invention

This invention relates to a method of making a rechargeable modified manganese dioxide material, as defined herein. The compound is combined with suitable additional materials to form a positive electrode for a battery cell.

2. Background of the Invention and Description of the Prior Art

Materials for use in battery electrodes which have the capability of being recharged are of the utmost importance in view of the effort being made to develop energy alternatives. These efforts have resulted primarily from increased awareness of environmental threats presented by continued use of conventional fossil fuels and by depletion of resources of such fuels. In addition, efforts are being made to promote national energy independence and alternatives to use of conventional automotive fuel, for example, are being sought. In particular, efforts have been increasingly made towards providing a rechargeable battery cell for use in an electric vehicle. Other important energy uses for rechargeable battery cells are space travel and satellites. Rechargeable energy sources are particularly useful as backups for solar energy systems as well.

A material which has been used extensively in the conventional disposable battery is a form of manganese dioxide prepared by an electrolytic method. Manganese dioxide prepared by the electrolytic method is used extensively in primary alkaline manganese dioxide-zinc cells. These cells are made in the charged state, are used once and then discarded. It is clear that providing rechargeability to such cells would result in substantial energy savings. Indeed, rechargeability in all types of battery cells is one of the ultimate goals in energy research and development.

The use of the manganese dioxide-zinc system is limited to primary cells because the discharged product of $MnO_2$ is essentially not rechargeable. This is particularly true if the material has been deep discharged to greater than 50 percent of the theoretical two-electron capacity. It has been shown that electrolytic manganese dioxide may be recharged in the range of 100 times, if it is discharged to less than 30 percent of the theoretical one-electron capacity (or less than 15 percent of the theoretical two-electron capacity.) Kordesch, et al. *Electrochemica Acta*, 26, 1495 (1981). This restriction of shallow discharge, however, limits the amounts of energy which can be retrieved from the cells. This reduces the rechargeability of the cell if $MnO_2$ is accidentally discharged beyond the limit given. As will be understood by those skilled in the art, the number of cycles decreases with the increase in the depth of discharge.

In a different attempt at rechargeability, $MnO_2$ has been physically mixed with oxides of bismuth, lead or mixtures thereof Wroblowa, et al., *Journal of Electroanalytical Chemistry*, 238, 93 (1987). The electrode composed of $MnO_2$ with $Bi_2O_3$ mixtures was shown to be rechargeable up to 250 cycles, but with a continuous drop in capacity as the number of cycles increased. In addition, this physical mixing process is time consuming and may lead to non-homogeneous mixtures, thereby affecting the performance of the electrodes. Moreover, the electrodes prepared with physical mixing require several electrochemical cycles for activation.

A method of preparing a modified manganese dioxide material by an electrolytic deposition process was disclosed in U.S. patent application Ser. No. 07/645,984, filed on Jan. 24, 1991, and entitled "Method of Preparing a Rechargeable Modified Manganese-Containing Material by Electrolytic Deposition and Related Material." That application is owned by the assignee of the present invention.

Other processes have been attempted to bring long-life rechargeability to a modified manganese dioxide material. A method of making a birnessite compound which included one type of modified manganese dioxide was disclosed in U.S. Pat. No. 4,520,005. The method disclosed, however, is a batch method which is not feasible for use in large scale commercial applications. Also, the resulting material has properties not suitable for use in commercial batteries. For example, it has low density and high resistivity.

U.S. Pat. No. 4,451,543 discloses a battery cell which includes a positive electrode composed of a modified manganese dioxide compound. The modified manganese dioxide compound disclosed in the patent is mixed with a percentage of bismuth, lead or mixtures thereof. The cell also includes a zinc negative electrode. The material disclosed can only be made in small batches over 12 to 24 hour periods. The amount of product developed during this relatively lengthy preparation time is generally unacceptable for any commercial application.

In addition, the material disclosed in the two aforementioned patents has to cycle with a suitable anode. As noted, zinc is a preferred anode, yet it has problems cycling because soluble zinc (zincate) in the electrolyte chemically reacts with the cathode material yielding a non-rechargeable mixed cathode.

Methods of producing traditional manganese dioxide by various electrolytic procedures were disclosed in the U.S. Pat. Nos. 3,535,217 and 4,048,027. Methods for providing ease of removal to electrolytically produced manganese dioxide powder were disclosed in U.S. Pat. Nos. 4,170,527 and 4,295,943.

None of these methods or procedures have developed a modified manganese dioxide material which is highly rechargeable in that it can be recycled with little loss in capacity between 500 to 900 times or more. Moreover, the density of prior art materials is not amenable to typical battery sizes in use commercially at the present time. In addition, there remains a need for a method of making a highly rechargeable modified manganese dioxide material which can be produced on a commercial scale in a feasible amount of time.

SUMMARY OF THE INVENTION

These and other needs are satisfied by the method of the present invention which is a simple and efficient method of making a rechargeable, modified manganese dioxide material. The material created by this method is rechargeable even when it has been deep discharged through more than 80 percent of the theoretical two-electron capacity. The method leads to a homogeneous compound unlike prior art methods discussed hereinbefore. The method consists of mixing manganese dioxide with an aqueous solution of a water soluble salt composed preferably of bismuth (such as, for example, bismuth nitrate), lead (such as, for example, lead acetate and lead nitrate), copper (such as, for example, copper sulphate, copper nitrate and copper chloride), or mixtures thereof. This mixed solution is reacted with an aqueous solution of an alkaline hydroxide, such as, for example, potassium hydroxide or sodium hydroxide. Precipitation of a resultant product is established as the second solution is added to the first solution while the first solution is stirred substantially continuously. The liquid is then decanted. The resultant product is then washed with water, and filtered to obtain a modified manganese dioxide material which is thereafter dried. This material is highly rechargeable as discussed fully hereinafter. The modified compound also differs substantially from the electrolytic manganese dioxide and from the compound prepared by the process taught in U.S. Pat. No. 4,520,005, as discussed in detail hereinafter.

The process of the present invention provides a compound which is highly rechargeable and has a high energy density. The associated cell with which the material can be used has a greatly increased cycling capacity over that generated by known rechargeable materials.

It is an object of the present invention to provide a method of making a modified manganese dioxide material which is highly rechargeable.

It is another object of the invention to provide a method of making a modified manganese dioxide material in a manner which can be economically used to create rechargeable battery systems on a large scale.

It is yet a further object of the invention to provide a method of producing a modified manganese dioxide material compound which has a high energy density.

It is a further object of the invention to provide a method of producing a rechargeable material which has increased capacity retention after hundreds of cycles.

It is yet a further object of the invention to provide a compound which can be used for a positive electrode in a battery cell which is rechargeable many times.

DESCRIPTION OF THE PREFERRED EMBODIMENTS

Figure 1:
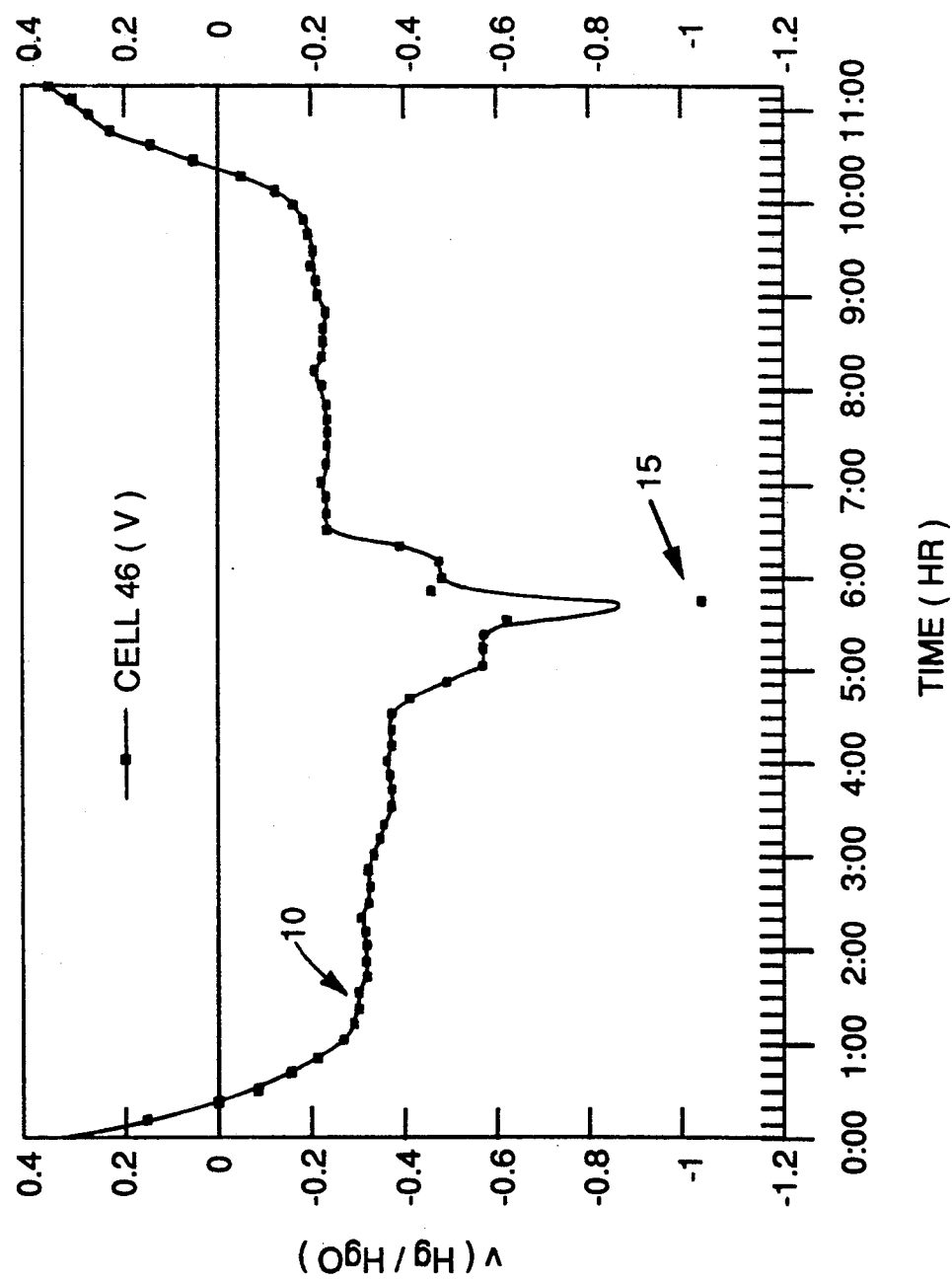
FIG. 1 is a typical charge-discharge cycle curve for an electrode prepared in accordance with and using the material of the present invention with voltage plotted along the ordinate and time along the abscissa.

This invention is directed towards a method of making a rechargeable "modified manganese dioxide material" for use, primarily, in rechargeable battery cells. As used herein, the term "modified manganese dioxide" includes mixtures of manganese dioxide with another material which may be bismuth, lead, copper or mixtures of oxides and hydroxides thereof, or of other soluble salts or mixtures of any of these materials, or other metals whose oxides or salts show stability in alkaline electrolytes and which possess redox behavior in the potential of modified manganese dioxide. Such a potential is about $-0.2$ v to $-0.6$ v with reference to an Hg/HgO reference electrode.

In accordance with the present invention, electrolytic $MnO_2$ may be used as one of the initial products. Electrolytic $MnO_2$ is conventional manganese dioxide prepared by known electrolytic methods which would be readily understood by those skilled in the art. Alternatively, chemical manganese dioxide may be used as an initial product. Chemical manganese dioxide is prepared by methods known to those skilled in art which involve mixing chemically reactive components to form $MnO_2$ as one of the by-products. Electrolytic $MnO_2$ or chemical $MnO_2$ is mixed with an aqueous solution of a water soluble salt selected from the group consisting of bismuth nitrate, lead acetate, lead nitrate, copper sulphate, copper nitrate, and copper chloride, and mixtures thereof to create a first solution. An aqueous solution of an alkaline hydroxide is then added to the first solution. The alkaline hydroxide is preferably selected from the group consisting of potassium hydroxide and sodium hydroxide. While the alkaline hydroxide is being added to the first solution, the combined solutions are simultaneously stirred. This establishes precipitation of a resultant product. The resultant product is washed with water, filtered and dried to obtain the modified manganese dioxide material of the present invention as described more fully hereinafter.

In accordance with one preferred embodiment of the method, between about 5 to 35 grams of bismuth nitrate is dissolved in about 5 to 35 milliliters of a concentrated solution of nitric acid at room temperature. The solution is added to about 250 to 1000 milliliters of distilled water. Thereafter between about 30 to 60 grams of electrolytic $MnO_2$ or chemical $MnO_2$ is added. Separately, between about 20 to 40 grams of potassium hydroxide is added to between about 75 to 150 milliliters of distilled water. The potassium hydroxide solution is then added dropwise into the mixture of $MnO_2$ and bismuth nitrate with continuous stirring. During the addition of the potassium hydroxide solution, a white precipitate of $Bi(OH)_3$ will be formed in the bulk of the solution as well on the surface of the $MnO_2$ particles which had been suspended in the solution due to the stirring. The liquid is decanted off and the resultant product is washed with water and filtered to obtain $MnO_2 \cdot Bi(OH)_3$. The material is then preferably transferred to an oven for drying.

In order to further clarify and enhance the disclosure of this embodiment of the method, several examples will be considered.

EXAMPLE I

Initially, about 24.253 grams of bismuth nitrate was dissolved in about 24 milliliters of concentrated $HNO_3$ at room temperature which is between about 65° to 75° F. The resulting solution was added to about 500 milliliters of distilled water followed by the addition of about 43.47 grams of electrolytic $MnO_2$. Thereafter, about 28 grams of KOH was dissolved in about 100 milliliters of distilled water. Substantially all of this KOH solution was added dropwise to the solution containing $MnO_2$ and bismuth nitrate with substantially continuous stirring. Because of the stirring, the $MnO_2$ particles remain suspended in the solution. During the addition of the KOH solution, a precipitate of $Bi(OH)_3$ is formed in the bulk of the solution as well as on the surface of the $MnO_2$ particles. When substantially all of the KOH has been added the stirring is preferably stopped. As stirring is stopped, $MnO_2$ particles coated with $Bi(OH)_3$ settle to the bottom of the container being used. The liquid portion is then decanted off. The compound is washed with about 1,500 milliliters of water. It is thereafter filtered and transferred to an oven for drying at a temperature of between about 150°–180° F. for between about 9 to 12 hours, or until a substantially constant weight is achieved. The reaction occurring during this procedure is as follows:

$$MnO_2 + Bi^{3+} + 3OH^- \rightarrow MnO_2 \cdot Bi(OH)_3$$

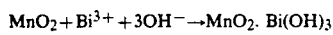

The rechargeable compound which is obtained has the following formula: $MnO_2 \cdot Bi(OH)_3$.

EXAMPLE II

Utilizing the compound prepared in accordance with Example I, about 1.5 grams of the compound was ball milled with about 8.0 grams of graphite for about 12 hours. Preferably, graphite known commercially as LONZA graphite (KS 44), which is available from Lonza Incorporated of Fair Lawn, N.J., is used. Thereafter, about 0.5 grams of a dispersion of tetrafluoroethylene, commonly know as TEFLON, which is available to those skilled in the art from the E. I. Du Pont de Nemours & Company of Wilmington, Del., was added. This TEFLON dispersion was added to the mixture and ball milled for about another three hours. The mixture was then to be used as a cathode in a test cell. About 1.046 of the cathode mix was pressed onto a piece of nickel gauze measuring about 1 inch×1 inch at about 10,000 psi. The resulting electrode was placed in a flat plexiglass cell with nickel as the counter electrode and Hg/HgO as the reference electrode. Pellon paper was used as the separator between electrodes. As the electrolyte, a 9M KOH solution was used.

The results of cycling this electrode are shown in FIG. 1. FIG. 1 shows a typical discharge-charge cycle curve 10 for the electrode prepared in accordance with this example. Curve 10 is plotted with time in hours along the abscissa and voltage as compared to an Hg/HgO reference electrode on the ordinate. As shown in FIG. 1, the degree of recharging after discharge which occurs up to the point designated by reference character 15 on curve 10 continues to rise to the same voltage as was achieved when the electrode was initially discharged.

Figure 2:
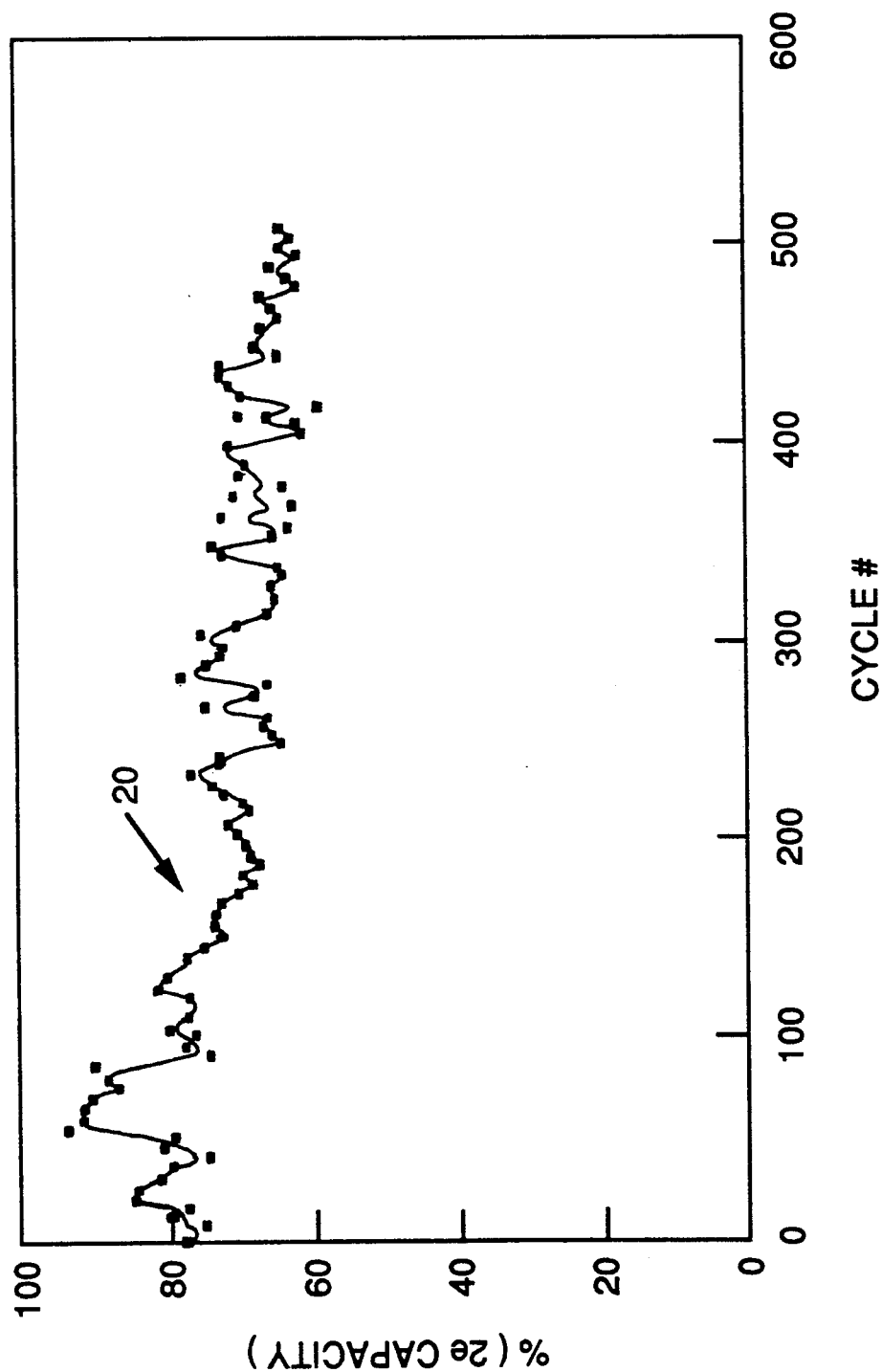
FIG. 2 shows a discharge capacity curve for a material prepared in accordance with the present invention with the percentage of the theoretical two-electron capacity plotted along the ordinate and the cycle number along the abscissa of the curve.

Referring to FIG. 2, the discharge capacity is shown for the electrode of Example II. FIG. 2 is a curve 20 of capacity in percentage of the theoretical two-electron capacity (based on the amount of Mn present) plotted along the ordinate with cycle number along the abscissa. The electrode, as can be seen from curve 20, has gone through more than 500 cycles in the range of 70 percent of the theoretical two-electron capacity with very little depletion in capacity from cycle to cycle.

EXAMPLE III

As with Example II, the compound was prepared in accordance with the first embodiment of the invention an example of which is given in Example I. The compound was then used in an electrode for cycling as discussed in Example II. Preferably, about 8.0 grams of the compound was ball milled with about 1.5 grams of LONZA graphite (KS 44) for about 12 hours. Thereafter, about 0.5 grams of a TEFLON dispersion was added to the mixture and this was ball milled for another three hours. This resulted in the cathode mix. About 1.00 grams of the cathode mix was pressed onto about a 1 inch×1 inch piece of nickel gauze at 10,000 psi. The resulting electrode was tested in the manner as was discussed with reference to Example II.

Figure 3:
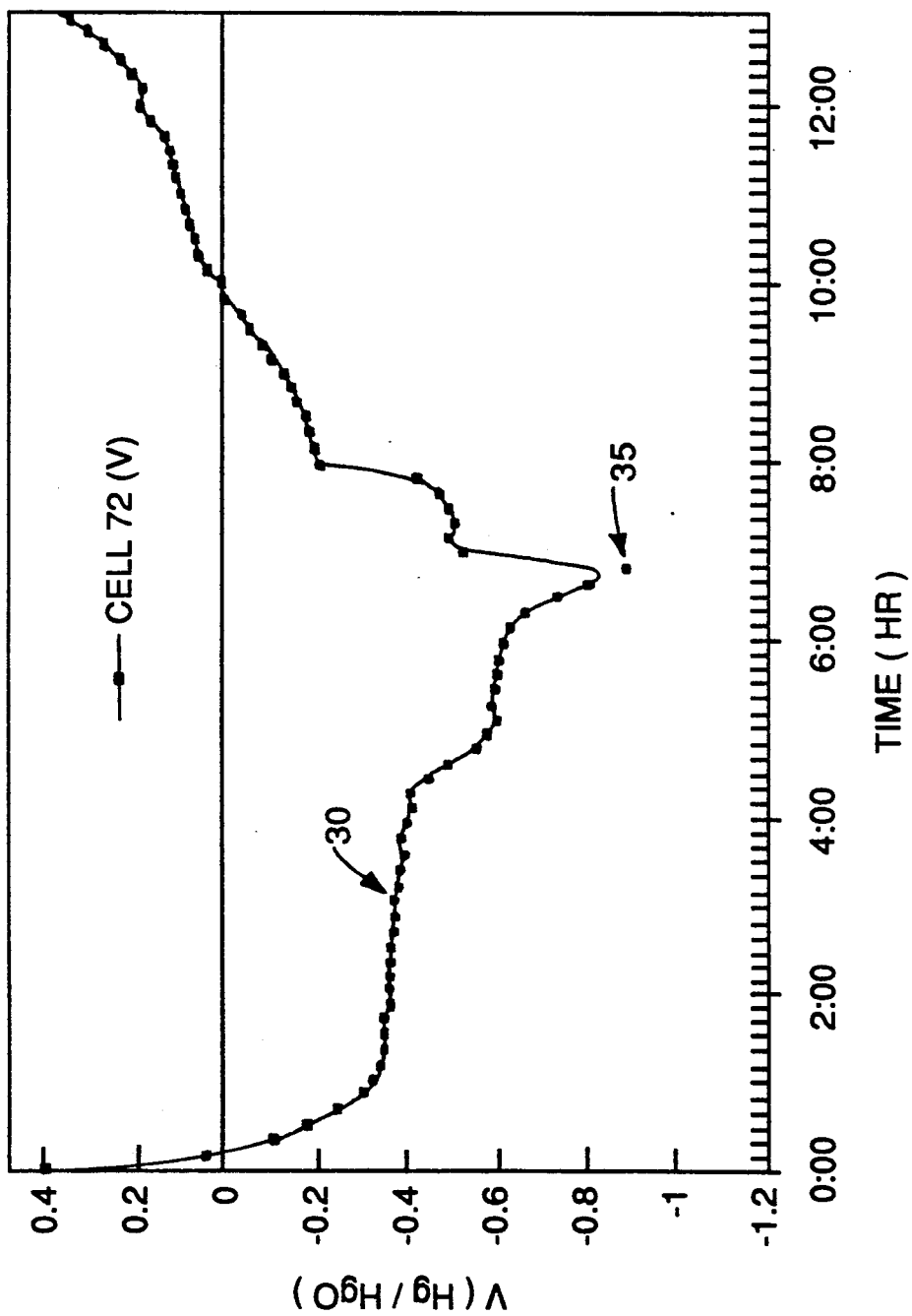
FIG. 3 shows a typical charge-discharge cycle for an electrode prepared with another compound made in accordance with the present invention with voltage along the ordinate and time in hours along the abscissa of the curve.

Referring to FIG. 3, a typical discharge-charge curve for the electrode will be discussed. Discharge-charge curve 30 is plotted with time in hours along the abscissa and voltage with reference to an Hg/HgO electrode on the ordinate. The discharging proceeds to the point designated by reference character 35 and upon recharging the electrode, the voltage achieved has not deteriorated. For this electrode, the capacity after 150 cycles was in the range of 50 percent of the theoretical two-electron capacity.

EXAMPLE IV

Figure 4:
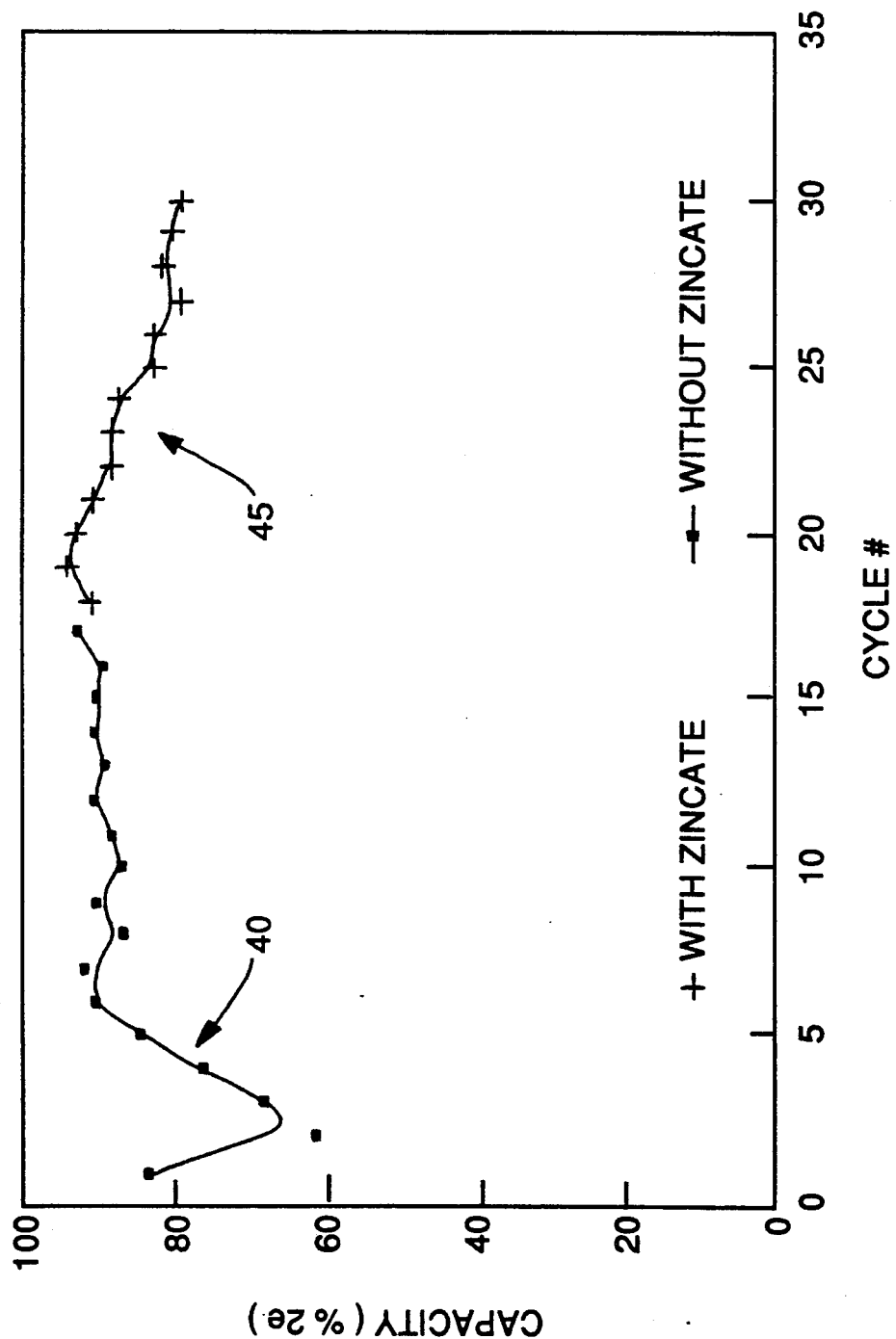
FIG. 4 is a curve showing the discharge capacity as a function of the number of cycles for the material of FIG. 3.

An electrode was prepared in the same manner as in Example II and was tested in a 9M KOH solution for 17 cycles. At the end of the 17th cycle an electrolyte containing 1M ZnO in 9M KOH was added to the cell. Referring to FIG. 4, the capacity is shown as a function of the number of cycles. First portion 40 of the curve is the cycling capacity shown prior to the addition of the zincate solution. It can be seen that this electrode cycles with a substantially constant capacity over the first fifteen cycles. Thereafter, the zincate solution was added and this is represented by portion 45 of the curve. Portion 45 begins at cycle 17 and a substantially continuous cycling capacity is obtained even after the addition of the zincate. In other words, after the addition of the zincate, the electrode continued to cycle with a capacity in the range of 75–80 percent of the theoretical two-electron capacity. This is particularly important in comparison with prior art methods in which zincate became problematic. As stated above, materials disclosed in the prior art must be cycled with suitable anodes. Zinc is the preferred anode, yet it creates problems cycling because soluble zinc (zincate) in the electrolyte chemically reacts with the material yielding a nonrechargeable mixed cathode. In the example of FIG. 3, a nickel counter-electrode is used so there is no actual problem regarding zincate. To simulate the action of a Zn anode we added zincate in the form of an electrolyte containing ZnO+KOH, and the results as noted above are shown in FIG. 3.

In accordance with yet another aspect of the invention, it is preferred to use lead nitrate in creating the modified manganese dioxide. More specifically, it is preferred to dissolve between about 15 to 20 grams of lead nitrate in about 80 to 125 milliliters of distilled water. The resulting solution is added to about 400 to 600 milliliters of water. Thereafter, about 40 to 50 grams of electrolytic $MnO_2$ or chemical $MnO_2$ is added to the solution. Separately, about 2 to 5 grams of KOH was dissolved in about 80 to 125 milliliters of distilled water. Substantially all of the KOH solution was added dropwise to the mixture of $MnO_2$ and lead nitrate with continuous stirring. During the addition of the KOH solution, a white precipitate of $Pb(OH)_2$ was formed in the bulk of the solution as well as on the surface of the $MnO_2$ particles. When all of the KOH was added, the stirring was stopped, resulting in settlement of the coated $MnO_2$ particles. Thereafter, the liquid was decanted off. The chemical reactions occurring during this procedure is as follows:

$$MnO_2 + Pb^{2+} + 2OH^- \xrightarrow{} MnO_2 \cdot Pb(OH)_2$$

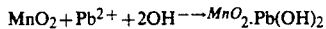

The resultant product was washed with about 1,500 milliliters of water and was filtered to obtain modified manganese dioxide of the formula $MnO_2 \cdot Pb(OH)_2$. The compound was then transferred to an oven for drying at temperatures of between about 150°–180° F. for between about 9–12 hours or until a constant weight was achieved.

It is noted that mixtures of lead nitrate and bismuth nitrate may also be used to create a modified manganese dioxide compound of the formula $$MnO_2 \cdot Pb(OH)_2 \cdot Bi(OH)_3.$$

In order to further enhance and clarify the disclosure with respect to the second embodiment of the method, several examples will be considered:

EXAMPLE V

In accordance was this embodiment of the invention, about 16.56 grams of lead nitrate was dissolved in about 100 milliliters of distilled water. The resulting solution was added to about 500 milliliters of water. Thereafter, about 43.47 grams of electrolytic $MnO_2$ was added to the solution. Separately, about 2.8 grams of KOH was dissolved in 100 milliliters of distilled water. Substantially all of the KOH solution was added dropwise to the solution of $MnO_2$ and lead nitrate with continuous stirring. During the addition of KOH, a white precipitate of $Pb(OH)_2$ was formed in the solution as well as on the surface of the suspended $MnO_2$ particles. When all of the KOH was added the stirring was stopped and the liquid was decanted off. The resulting compound was washed with about 1,500 milliliters of water and was filtered and then transferred to an oven for drying.

EXAMPLE VI

Figure 5:
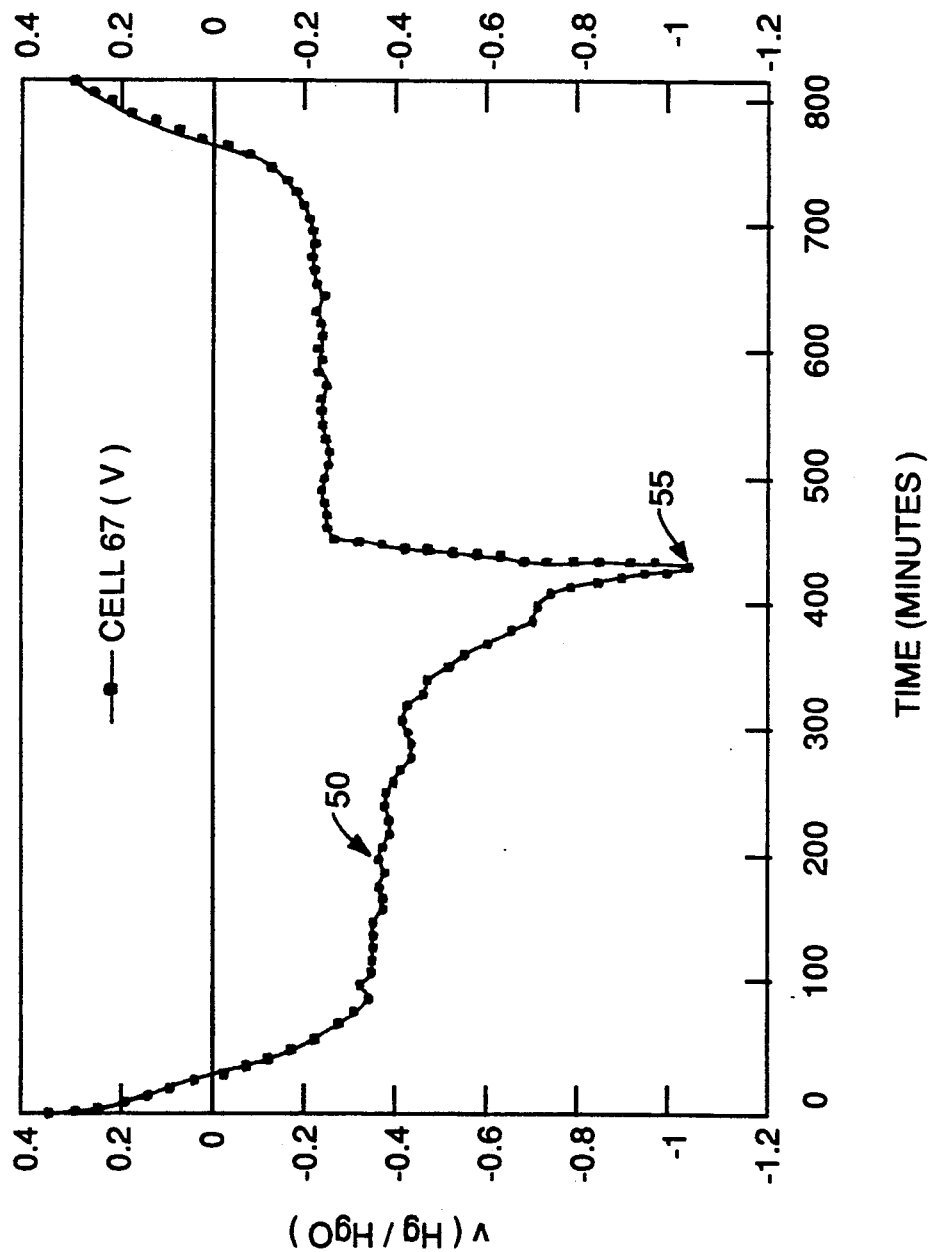
FIG. 5 is a typical charge-discharge curve for another compound made in accordance with the method of the present invention with voltage along the ordinate and time in minutes along the abscissa.

Using the compound prepared in accordance with this embodiment of the invention and preferably prepared in accordance with Example V, about 3.0 grams of the compound was ball milled with about 6.5 grams of LONZA graphite (KS 44) for about 12 hours. Thereafter, about 0.5 grams of a TEFLON dispersion was added to the mixture and ball milled for about another 3 hours. This cathode mix was then used for testing and cycling. In order to create the test cell, about 1.039 grams of the cathode mix so created was pressed onto about a 1"×1" piece of nickel gauze at 10,000 psi. The resulting electrode was placed in a flat plexiglass cell with nickel as a counter-electrode. A Hg/HgO reference electrode was utilized and pellon paper was used as the separator. For the electrolyte, a 9M KOH solution was used. Referring to FIG. 5, a typical discharge-charge cycle curve 50 is shown in which time in minutes is plotted along the abscissa and voltage with reference to an Hg/HgO reference electrode is plotted along the ordinate. Again, as is shown with the compounds discussed hereinbefore, the electrode was discharged to the point designated by reference character 55 on curve 50 and is then recharged with no depletion in capacity.

Figure 6:
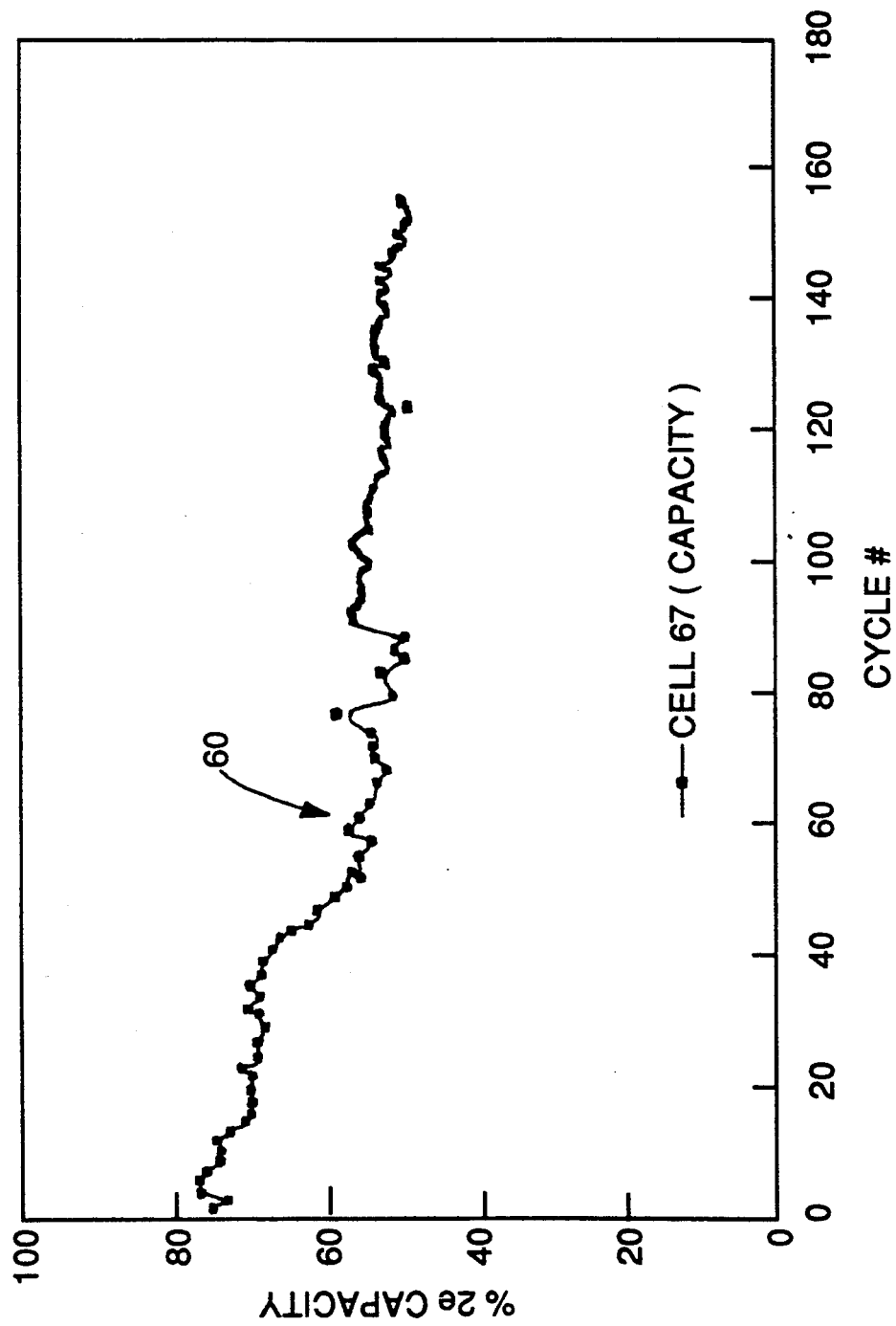
FIG. 6 shows the discharge capacity for the compound of FIG. 5 with the percentage of theoretical two-electron capacity along the ordinate and cycle number along the abscissa.

This is more particularly shown with reference to FIG. 6. FIG. 6 shows a discharge capacity curve 60 which is a plot of the percentage of the theoretical two-electron capacity plotted along the ordinate and cycle number plotted along the abscissa. As shown in FIG. 6, the electrode had gone through 154 cycles with a depth of discharge in the range of about 50 percent of the two-electron capacity. In other words, the capacity remains substantially constant over many cycles.

EXAMPLE VII

As stated hereinbefore, chemical $MnO_2$ can be used as an initial component in the reaction instead of electrolytic $MnO_2$. By way of example, about 24.25 grams of bismuth nitrate was dissolved in about 24 milliliters of concentrated $HNO_3$ at room temperature. The resulting solution was added to about 500 milliliters of distilled water followed by the addition of about 43.47 grams of chemical $MnO_2$. Thereafter, about 28 grams of KOH was dissolved in about 100 milliliters of distilled water. Substantially all of this KOH solution was added dropwise to the solution containing the $MnO_2$ and bismuth nitrate with substantially continuous stirring.

During the addition of the KOH solution, a precipitate of $Bi(OH)_3$ is formed in the bulk of the solution as well as on the surface of the $MnO_2$ particles. When substantially all of the KOH has been added, the stirring is stopped. As the stirring stops, $MnO_2$ particles coated with $Bi(OH)_3$ settle to the bottom of the container. The liquid portion is decanted off and the compound is washed, filtered and dried. The reaction occurring during this procedure is as follows:

$$MnO_2 + Bi^{3+} + 3OH^- \xrightarrow{} MnO_2 \cdot Bi(OH)_3$$

The rechargeable compound obtained has the formula $MnO_2 \cdot Bi(OH)_3$. This compound was then used in a test cell. About 1.5 grams of the compound was ball milled with about 8.0 grams of LONZA graphite (KS 44). Thereafter, about 0.5 grams of a dispersion of TEFLON was added and the resulting mixture was ball milled for about another three hours.

The mixture was then formed into a cathode mix. More specifically, about 1.046 of the cathode mix was pressed into a piece of nickel gauze measuring about 1 inch ×1 inch at about 10,000 psi. The resulting electrode was placed in a flat plexiglass cell with nickel as the counter electrode and Hg/HgO as the reference electrode. A separator composed of pellon paper was used between the electrodes. A 9M KOH solution was used as the electrolyte.

Figure 7:
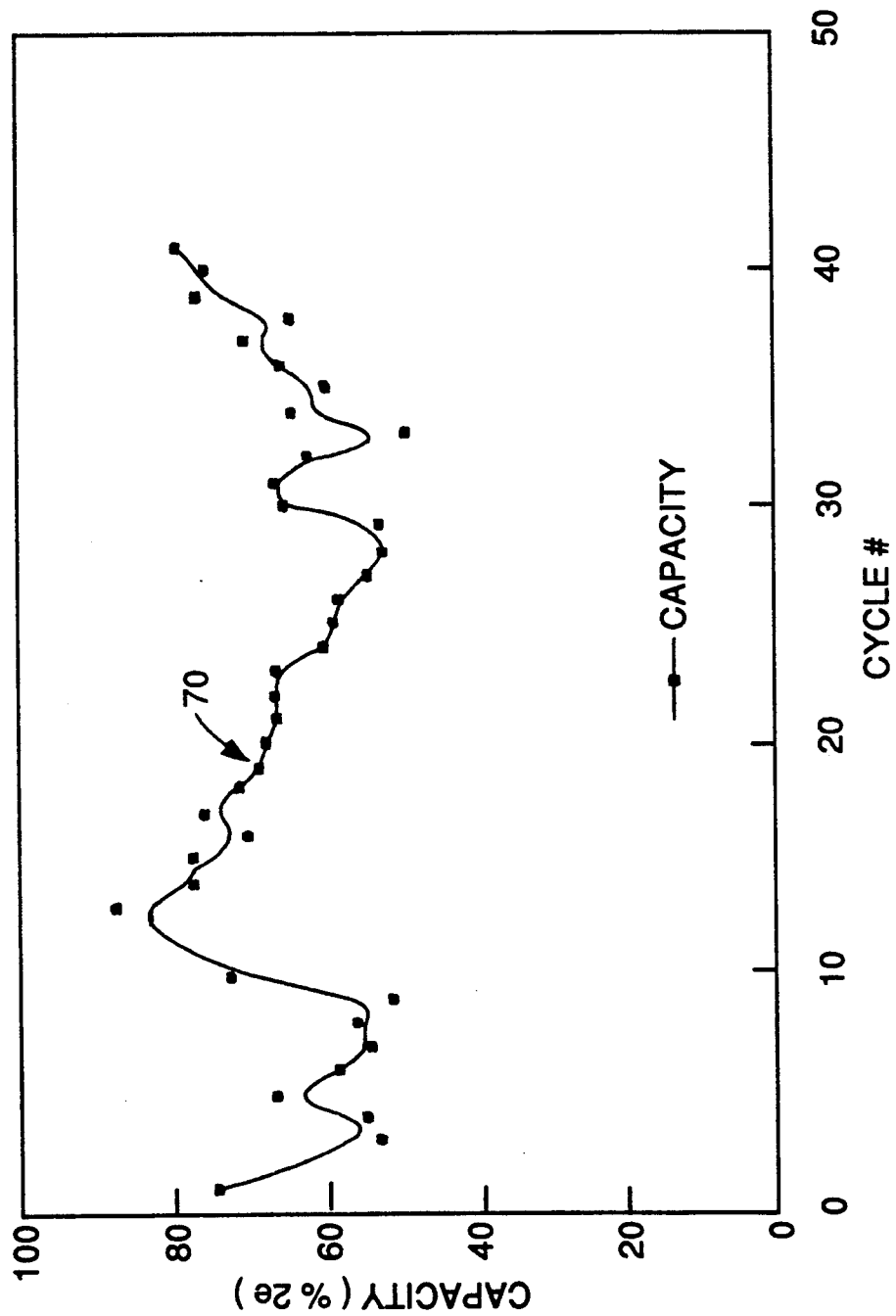
FIG. 7 shows the discharge capacity for the compound of the present invention prepared with chemical manganese dioxide with the percentage of theoretical two-electron capacity along the ordinate and cycle number along the abscissa.

The results of cycling this electrode are shown in FIG. 7. FIG. 7 shows curve 70 which is a plot of capacity in percentage of the theoretical two-electron capacity (based on the amount of Mn present) along the ordinate versus cycle number on the abscissa. As shown by curve 70, the capacity of this electrode remains in the range of 60 to 70 percent of the theoretical two-electron capacity over the forty cycles tested.

Comparisons tests were run with the material created in accordance with the present invention and conventional electrolytic $MnO_2$ as well as the prior art material disclosed in U.S. Pat. No. 4,520,005. More specifically, for use in practical batteries, a pressed density value is an important parameter. The data set forth in Table 1 hereinbelow indicates that as compared to the material of the prior art, twice as much can be used in the fixed volume of the battery container if the material of the present invention is used. This leads to a higher battery capacity.

TABLE 1

|  | Real Density | Powder Density | Pressed Density (15,000 psi) |
| --- | --- | --- | --- |
| Present Invention | 4.3 gm/cm$^3$ | 1.65 gm/cm$^3$ | 3.25 gm/cm$^3$ |
| Conventional Electrolytic Manganese Dioxide | 3.9 gm/cm$^3$ | 1.70 gm/cm$^3$ | 2.87 gm/cm$^3$ |
| U.S. Pat. No. 4,520,005 | 3.5 gm/cm$^3$ | 0.7 gm/cm$^3$ | 1.70 gm/cm$^3$ |

The data also indicates that the material of the present invention is highly more conductive than the rechargeable type of $MnO_2$ taught in U.S. Pat. No. 4,520,005. In particular, as shown in Table 2, the material has a substantially lower resistivity and is thus more conductive than the prior art material. In fact, the prior art material is over 200 times more resistive than the material of the present invention. This allows the material to be used with lower quantities of conducting additive, such as for example, graphite. Thus, using the material of the present invention a greater amount of active material can be placed into the battery container leading to higher capacity. Moreover, due to better conductivity of the material, the performance of the battery should improve.

TABLE 2

| Electrical Resistivity (15,000 psi) | |
| --- | --- |
| Present Invention | $3 \times 10^3$ ohm-cm |
| Conventional Electrolytic Manganese Dioxide | $2 \times 10^3$ ohm-cm |
| U.S. Pat. No. 4,520,005 | $7 \times 10^5$ ohm-cm |

Other properties of the material of the present invention are also greatly improved over conventional electrolytic manganese dioxide and other prior art materials. For example, as discussed hereinbefore the material of the present invention has a capacity which is continuous at about 70 percent of the theoretical two-electron capacity after 500 cycles. Conventional electrolytic manganese dioxide is essentially not rechargeable. The prior art material when acid washed can be rechargeable to about 55 percent of the theoretical two-electron capacity after 60 cycles. If it is non-acid washed, the material of the prior art will exhibit between about 45 and 48 percent of the theoretical two-electron capacity after 60 cycles.

The volume capacity of the material of the present invention is also improved. For example, the material of the present invention including about 15 percent graphite will provide about 420 ampere-hours/liter to 1.0 volt. By comparison, the prior art acid-washed material when mixed with graphite in a ratio by weight of about 1 to 2 will exhibit about 140 ampere hours per liter as an average volume capacity.

The effect of zincate was discussed hereinbefore but it should be understood that the material of the present invention still exhibits about 75 percent of the theoretical two-electron capacity for at least 15 cycles even with zincate present, whereas the material of the prior art shows a capacity of only 10 percent of the theoretical two-electron capacity after 10 cycles due to the effect of zincate.

In forming a cathode mix for a rechargeable battery cell, it is desirable to provide the compound of the present invention in an electrode of about 15–80 percent by weight and preferably in the range of about 50 to 80 percent by weight of the total electrode material. An electrically conducting reinforcement material is also added. This conducting reinforcement material is preferably selected from the group consisting of graphite (LONZA KS 44), acetylene black, metal powder and fiber. The metal powder is preferably selected from the group consisting of nickel, nickel-plated iron and nickel-plated copper. It is preferred to provide about 15 to 80 percent by weight of the conducting reinforcement component to the cathode mix. Additionally, a binder is added which is preferably tetrafluoroethylene ("TEFLON") and will be about 2 to 10 percent by weight of the total electrode material.

As noted hereinbefore, the conductive qualities of the material of the present invention are greatly increased over the known prior art materials so that not a large degree of the conducting reinforcing material is required.

It is noted that one of the primary advantageous uses of the material of the present invention is in a rechargeable battery cell. The battery can assume any conventional or desired configuration. In such application, a suitable battery container is provided. The material of the present invention is formed into a cathode in the manner hereinbefore discussed. The cathode is placed in a container with a suitable anode, and is spaced apart from the anode with a separator therebetween. A suitable electrolyte is then placed in the cell and the battery container is sealed.

It should be understood that the materials disclosed in the present invention are highly rechargeable and show greatly improved properties relevant to use in long life batteries which can be produced on a large scale. For example, this highly dense, highly conductive material cycles at at least 55 per cent of the theoretical two-electron capacity for more than 900 cycles. In addition, the method of the present invention is extremely simple, low cost and can produce a substantial amount of product in a feasible amount of time for use on a commercial scale. The material is particularly suited to rechargeable cells because of the greatly improved pressed density values as discussed herein.

Whereas, particular embodiments of the invention have been described for purposes of illustration, it will be appreciated by those skilled in the art that numerous variations of the details may be made without departing from the invention as described in the appended claims.

What is claimed is:

1. A method of making a rechargeable, modified manganese dioxide electrode material, comprising
    mixing manganese dioxide with an aqueous solution of a water soluble salt component to establish $MnO_2$ particles suspended in a first solution, and admixing with said first solution, a second solution which is an aqueous solution of an alkaline hydroxide to establish precipitation of a resultant product which coats said $MnO_2$ particles.

2. The method of claim 1 including
selecting said water soluble salt component from the group consisting of bismuth nitrate, lead acetate, lead nitrate, copper sulfate, copper nitrate, copper chloride and mixtures thereof.

3. The method of claim 2 including
selecting said alkaline hydroxide for said second solution from the group consisting of potassium hydroxide and sodium hydroxide.

4. The method of claim 3 also including
washing, filtering and drying said resultant product including said coated particles to obtain said modified manganese dioxide material.

5. The method of claim 1 including
mixing electrolytic manganese dioxide with said first solution.

6. The method of claim 1 including
mixing chemical manganese dioxide with said first solution.

7. The method of claim 3 including
continuously stirring said first solution while said second solution is being added during said admixing stage.

8. The method of claim 3 including
selecting bismuth nitrate as said water soluble salt component and establishing said first solution by dissolving said bismuth nitrate in a solution of nitric acid, and
adding said bismuth nitrate dissolved in nitric acid to distilled water and adding manganese dioxide thereto.

9. The method of claim 8 including establishing said first solution by dissolving about 5 to 35 grams of bismuth nitrate in about 5 to 35 milliliters of concentrated nitric acid, and adding to said bismuth nitrate dissolved in said nitric acid about 250 to 1000 milliliters of distilled water, and
adding about 30 to 60 grams of $MnO_2$.

10. The method of claim 9 including
selecting as said second solution an aqueous solution of potassium hydroxide, and filtering said resultant product to obtain a modified manganese dioxide material of the formula $MnO_2 \cdot Bi(OH)_3$.

11. The method of claim 10 including dissolving about 20 to 40 milliliters of potassium hydroxide in about 75 to 150 milliliters of distilled water.

12. The method of claim 3 including
selecting lead nitrate as said water soluble salt component.

13. The method of claim 12 including
establishing said first solution by dissolving said lead nitrate in distilled water, and
adding manganese dioxide thereto.

14. The method of claim 13 including
establishing said first solution by dissolving about 15 to 20 grams of lead nitrate in about 80 to 125 milliliters of distilled water, and adding an additional 400 to 600 milliliters of water, and
adding thereto about 40 to 50 grams of $MnO_2$.

15. The method of claim 14 including
selecting as said second solution an aqueous solution of potassium hydroxide and filtering said resultant product to obtain a modified manganese dioxide compound of the formula $MnO_2 \cdot Pb(OH)_2$.

16. The method of claim 15 including dissolving about 2 to 5 grams of potassium hydroxide in about 80 to 125 milliliters of distilled water.

17. The method of claim 4 including the further steps of
mixing said modified manganese dioxide material with an electrically conducting reinforcement component,
ball milling the mixture for enhancing the efficiency of mixing,
adding a binder to said mixture, and
ball milling said mixture including said binder for an additional predetermined time period to create a cathode mix.

18. The method of claim 17 including
mixing about 15 to 80 percent by weight of said modified manganese dioxide material with about 15 to 80 percent by weight of said conducting reinforcement component and about 2 to 10 percent by weight of said binder.

19. The method of claim 18 including
mixing about 50 to 80 percent by weight of said modified manganese dioxide material with about 15 to 45 percent by weight of said conducting reinforcement component.

20. The method of claim 18 including
selecting said conducting reinforcement component from the group consisting of graphite, acetylene black, metal powder and fiber.

21. The method of claim 20 including employing metal powder as said conducting reinforcement component, and
selecting said metal powder from the group consisting of nickel, nickel plated iron and nickel plated copper.

22. The method of claim 21 including
providing tetrafluoroethylene as said binder.

23. A rechargeable, modified manganese dioxide material, comprising
manganese dioxide coated with a metal hydroxide wherein said metal is selected from the group consisting of bismuth, lead, copper and mixtures thereof.

24. The modified manganese dioxide material of claim 23 wherein
said selected metal is bismuth and wherein said material has the formula $MnO_2 \cdot Bi(OH)_3$.

25. The modified manganese dioxide material of claim 23 wherein
said selected metal is lead such that said material has the formula $MnO_2 \cdot Pb(OH)_2$.

26. The modified manganese dioxide material of claim 23 wherein
said selected metal is a mixture of lead and bismuth such that said material has the formula $MnO_2 \cdot Pb(OH)_2 \cdot Bi(OH)_3$.

27. A modified manganese dioxide electrode material comprising
manganese dioxide coated with a metal hydroxide wherein said metal is selected from the group consisting of bismuth, lead, copper and mixtures thereof,
an electrically conducting reinforcement component selected from the group consisting of graphite, acetylene black, metal powder and fiber, and
a binder bonding said mixture.

28. The modified manganese dioxide electrode material of claim 27 wherein said binder is tetrafluoroethylene.

29. The modified manganese dioxide electrode material of claim 28 wherein
said metal powder is selected from the group consisting of nickel, nickel plated iron, and nickel plated copper.

30. The modified manganese dioxide electrode material of claim 29 wherein
said material has a pressed density at about 15,000 psi, of between about 3.0 and 3.4 gm/cm$^3$.

31. The modified manganese dioxide electrode material of claim 30 wherein
said material has an electrical resistivity of between about $2 \times 10^3$ and $5 \times 10^3$ ohm-cm.

32. The modified manganese dioxide electrode material of claim 31 wherein
said material has a cycling capacity of about 70 percent of the theoretical two-electron capacity for at least 500 cycles.

33. The modified manganese dioxide electrode material of claim 31 wherein
said material has a cycling capacity of at least about 55 percent of the theoretical two-electron capacity for at least 900 cycles.

34. The modified manganese dioxide electrode material of claim 32 wherein
said material includes graphite as said conducting reinforcement component, and said material has a volume capacity of about 420 ampere-hours/liter to 1.0 volt.

35. A rechargeable battery cell comprising
a battery housing,
a positive electrode composed of a modified manganese dioxide material comprising manganese dioxide coated with a metal hydroxide wherein said metal is selected from the group consisting of bismuth, lead, copper and mixtures thereof, and said positive electrode also including an electrically conducting reinforcement component and a binder,
a negative electrode disposed within said housing in spaced relationship to said positive electrode,
a separator disposed between said positive and said negative electrode,
an electrolyte contained within said housing in contact with said positive and negative electrode, and
means for electrically connecting said positive electrode and said negative electrode.

36. The battery cell of claim 35 wherein
said positive electrode includes a material having the formula $MnO_2 \cdot Bi(OH)_3$ as said modified manganese dioxide material.

37. The battery cell of claim 35 wherein
said positive electrode includes a material having the formula $MnO_2 \cdot Pb(OH)_2$ as said modified manganese dioxide material.

38. The battery cell of claim 35 wherein
said positive electrode includes a material having the formula $MnO_2 \cdot Pb(OH)_2 \cdot Bi(OH)_3$.

* * * * *

UNITED STATES PATENT AND TRADEMARK OFFICE
CERTIFICATE OF CORRECTION

PATENT NO. : 5,156,934
DATED : October 20, 1992
INVENTOR(S) : RAMESH C. KAINTHLA et al.

It is certified that error appears in the above-identified patent and that said Letters Patent is hereby corrected as shown below:

On the title page, item (75) inventors, "Kainthia" should read --Kainthla--.

Signed and Sealed this

Twenty-eighth Day of June, 1994

Attest:

BRUCE LEHMAN

Attesting Officer    Commissioner of Patents and Trademarks